US012617586B2

(12) United States Patent
Tanoue et al.

(10) Patent No.: US 12,617,586 B2
(45) Date of Patent: May 5, 2026

(54) FITTING TOOL AND FITTING-TOOL-EQUIPPED BAG BODY

(71) Applicant: C.I. TAKIRON Corporation, Osaka (JP)

(72) Inventors: Naoto Tanoue, Osaka (JP); Shin Takagawa, Osaka (JP)

(73) Assignee: C.I. TAKIRON CORPORATION, Osaka (JP)

( * ) Notice: Subject to any disclaimer, the term of this patent is extended or adjusted under 35 U.S.C. 154(b) by 86 days.

(21) Appl. No.: 18/850,511

(22) PCT Filed: Mar. 17, 2023

(86) PCT No.: PCT/JP2023/010741
§ 371 (c)(1),
(2) Date: Sep. 24, 2024

(87) PCT Pub. No.: WO2023/189770
PCT Pub. Date: Oct. 5, 2023

(65) Prior Publication Data
US 2025/0214750 A1      Jul. 3, 2025

(30) Foreign Application Priority Data

Mar. 31, 2022      (JP) ................................. 2022-058737

(51) Int. Cl.
  B65D 3/00        (2006.01)
  A44B 19/16       (2006.01)
  (Continued)

(52) U.S. Cl.
  CPC .......... B65D 33/2541 (2013.01); A44B 19/16 (2013.01); B32B 1/00 (2013.01); (Continued)

(58) Field of Classification Search
  CPC ....... B65D 33/2541; A44B 19/16; B32B 1/00; B32B 27/08; B32B 27/32
  (Continued)

(56) References Cited

U.S. PATENT DOCUMENTS 4,733,778 A * 3/1988 Boeckmann ........... B65D 73/02
                                                              220/788
5,012,561 A * 5/1991 Porchia .............. B65D 33/2541
                                                              24/585.12
(Continued)

FOREIGN PATENT DOCUMENTS

EP          0834454 B1      2/2000
JP          06122460 A      5/1994
(Continued)

OTHER PUBLICATIONS

International Search Report, mailed May 30, 2023, for corresponding International Application No. PCT/JP2023/010741 (4 pages).
(Continued)

*Primary Examiner* — Peter N Helvey
(74) *Attorney, Agent, or Firm* — Seed Intellectual Property Law Group LLP

(57) ABSTRACT

An object of the present invention is to provide a fitting tool in which interlayer peeling is less likely to occur and the occurrence of curling is suppressed, and a fitting-tool-equipped bag body using the fitting tool. In a fitting tool including a male side fitting member in which a male side fitting portion is provided on a band-shaped first base material, and a female side fitting member in which a female side fitting portion is provided on a band-shaped second base material, each of the first base material and the second base material includes a main layer, an interlayer, and a seal layer laminated from a fitting portion side, and satisfies that (1) the main layer, the interlayer, and the seal layer contain at least one kind of same type of resin, (2) a melting point $T_A$ (° C.)

(Continued)

WIDTH DIRECTION of the main layer, a melting point $T_B$ (° C.) of the interlayer, and a melting point $T_C$ (° C.) of the seal layer satisfy a relationship of $T_B > T_A > T_C$, and (3) a thickness $t_A$ (μm) of the main layer, a thickness $t_B$ (μm) of the interlayer, and a thickness $t_C$ of the seal layer satisfy a relationship of $t_B > t_A > t_C$.

6 Claims, 8 Drawing Sheets

(51) Int. Cl.
| | | |
|---|---|---|
| *B32B 1/00* | (2006.01) | |
| *B32B 7/027* | (2019.01) | |
| *B32B 27/08* | (2006.01) | |
| *B32B 27/32* | (2006.01) | |
| *B65D 33/25* | (2006.01) | |

(52) U.S. Cl.
CPC ............. *B32B 7/027* (2019.01); *B32B 27/08* (2013.01); *B32B 27/32* (2013.01); *B32B 2250/242* (2013.01); *B32B 2307/72* (2013.01); *B32B 2307/7376* (2023.05)

(58) Field of Classification Search
USPC .......................................................... 383/63
See application file for complete search history.

(56) References Cited

U.S. PATENT DOCUMENTS

| | | | | |
|---|---|---|---|---|
| 5,729,876 | A * | 3/1998 | Johnson ............. | B65D 33/2541 24/587.1 |
| 8,974,118 | B2 * | 3/2015 | Pawloski ............. | B65D 33/255 24/399 |
| RE48,721 | E * | 9/2021 | Nouri ................. | B65D 33/2541 |
| 11,180,286 | B2 * | 11/2021 | Pawloski ............. | B65D 33/255 |
| 11,370,064 | B2 | 6/2022 | Katada et al. | |
| 11,873,143 | B2 * | 1/2024 | Maguire ........... | B65D 43/0212 |

FOREIGN PATENT DOCUMENTS

| | | | |
|---|---|---|---|
| JP | 2002104440 | A | 4/2002 |
| JP | 2005178068 | A | 7/2005 |
| JP | 2006176196 | A | 7/2006 |
| JP | 2008125799 | A | 6/2008 |
| JP | 6433856 | B2 | 12/2018 |
| WO | WO 2016163487 | A1 | 10/2016 |

OTHER PUBLICATIONS

Extended European Search Report, mailed Jan. 23, 2026, for European Patent Application No. 23779786.5. (6 pages).
Office Action, dated Aug. 26, 2025, for Japanese Patent Application No. 2022-058737. (5 pages) (with English Translation).

* cited by examiner

FITTING TOOL AND FITTING-TOOL-EQUIPPED BAG BODY

TECHNICAL FIELD

The present invention relates to a fitting tool, particularly a fitting tool in which interlayer peeling is less likely to occur and curling is less likely to occur after molding, and a fitting-tool-equipped bag body using the same.

Priority is claimed on Japanese Patent Application No. 2022-058737, filed Mar. 31, 2022, the content of which is incorporated herein by reference.

BACKGROUND ART

In various fields such as food, chemicals, general goods, and the like, a fitting-tool-equipped bag body in which a fitting tool that opens and closes an opening portion is attached to an inner surface of a bag main body in the vicinity of the opening portion is widely used.

The fitting tool is required to be able to be adhered so as not to impair the appearance of the bag body during bag making. In a fitting tool of the related art, the occurrence of wrinkles and deterioration of the appearance during bag making are suppressed by using a base material including a resin layer having high hardness.

Patent Document 1 discloses a fitting tool including a three-layered base material including a front surface layer and a rear surface layer consisting of a polyethylene or polypropylene resin film, and an interlayer consisting of a nylon or polyester resin film.

CITATION LIST

Patent Document

Patent Document 1: Japanese Unexamined Patent Application, First Publication No. H06-122460

SUMMARY OF INVENTION

Technical Problem

It is important that a fitting tool having a multilayer structure sufficiently suppress the occurrence of interlayer peeling. In addition, in a case where curling occurs in the fitting tool after molding, it is difficult to adhere the fitting tool to a bag main body. However, in Patent Document 1, the suppression of curling while suppressing interlayer peeling was not studied.

An object of the present invention is to provide a fitting tool in which interlayer peeling is less likely to occur and the occurrence of curling is suppressed, and a fitting-tool-equipped bag body using the fitting tool.

Solution to Problem

The present invention includes the following aspects.

[1] A fitting tool including a male side fitting member in which a male side fitting portion is provided on a surface of a band-shaped first base material along a longitudinal direction, and a female side fitting member in which a female side fitting portion is provided on a surface of a band-shaped second base material along the longitudinal direction, in which the male side fitting portion and the female side fitting portion are detachably fit, in which each of the first base material and the second base material includes a main layer, a seal layer provided on a side of the main layer opposite the male side fitting portion and the female side fitting portion, and an interlayer provided between the main layer and the seal layer, and each of the first base material and the second base material satisfies the following conditions (1) to (3).

(1) The main layer, the interlayer, and the seal layer contain at least one kind of same type of resin.

(2) A melting point $T_A$ (° C.) of the main layer, a melting point $T_B$ (° C.) of the interlayer, and a melting point $T_C$ (° C.) of the seal layer satisfy a relationship of $T_B > T_A > T_C$ (the melting point $T_A$, in a case where the main layer is formed of a plurality of resins, is a lowest melting point among melting points of the resins, and the same applies to the melting point $T_B$ and the melting point $T_C$).

(3) A thickness $t_A$ (μm) of the main layer, a thickness $t_B$ (μm) of the interlayer, and a thickness $t_C$ of the seal layer satisfy a relationship of $t_B > t_A > t_C$.

[2] The fitting tool according to [1], in which the interlayer contains a resin having a density of 930 kg/m$^3$ or more.

[3] The fitting tool according to [1] or [2], in which, in a cut surface obtained by cutting the fitting tool in a fit state in a direction perpendicular to the longitudinal direction, both a curl angle $\theta_1$ of the male side fitting member, which is obtained by the following method (1), and a curl angle $\theta_2$ of the female side fitting member, which is obtained by the following method (2), are 0.5° or more and 20° or less, and both a position $D_3$ of a terminal of the male side fitting member, which is obtained by the following method (3), and a position $D_5$ of a terminal of the female side fitting member, which is obtained by the following method (4), are −1.5 mm or more and +0.75 mm or less.

Method (1)

A center line of the male side fitting portion in a width direction is defined as a straight line k1, an intersection of the straight line k1 with a surface of the first base material opposite a surface on which the male side fitting portion is provided is defined as a point O1, and a straight line orthogonal to the straight line k1 passing through the point O1 is defined as a reference line k2.

A position on one end portion side of the straight line k1 of the first base material, at which a distance from the reference line k2 on the surface of the first base material is the largest, is defined as a point A1. A position of an end on the one end portion side of the first base material on the reference line k2, in a state where the first base material is linearly extended along the reference line k2, is defined as a point C1. An angle $\theta_{A1}$ (an angle in a direction curled from the reference line) between a straight line passing through the point A1 and the point O1 and the reference line k2 is measured.

A position on the other end portion side of the straight line k1 of the first base material, at which a distance from the reference line k2 on the surface of the first base material is the largest, is defined as a point B1. A position of an end on the other end portion side of the first base material on the reference line k2, in a state where the first base material is linearly extended along the reference line k2, is defined as a point D1. An angle $\theta_{B1}$ (an angle in a direction curled from the reference line) between a straight line passing through the point B1 and the point O1 and the reference line k2 is measured.

An average of the angle $\theta_{A1}$ and the angle $\theta_{B1}$ is defined as a curl angle $\theta_1$.

Method (2)

A center line of the female side fitting portion in a width direction is defined as a straight line k3, an intersection of the straight line k3 with a surface of the second base material opposite a surface on which the female side fitting portion is provided is defined as a point O2, and a straight line orthogonal to the straight line k3 passing through the point O2 is defined as a reference line k4.

A position on one end portion side of the straight line k3 of the second base material, at which a distance from the reference line k4 on the surface of the second base material is the largest, is defined as a point A2. A position of an end on the one end portion side of the second base material on the reference line k4, in a state where the second base material is linearly extended along the reference line k4, is defined as a point C2. An angle $\theta_{A2}$ (an angle in a direction curled from the reference line) between a straight line passing through the point A2 and the point O2 and the reference line k4 is measured.

A position on the other end portion side of the straight line k3 of the second base material, at which a distance from the reference line k4 on the surface of the second base material is the largest, is defined as a point B2. A position of an end on the other end portion side of the second base material on the reference line k4, in a state where the second base material is linearly extended along the reference line k4, is defined as a point D2. An angle $\theta_{B2}$ (an angle in a direction curled from the reference line) between a straight line passing through the point B2 and the point O2 and the reference line k4 is measured.

An average of angle $\theta_{A2}$ and angle $\theta_{B2}$ is defined as a curl angle $\theta_2$.

Method (3)

A center line of the male side fitting portion in a width direction is defined as a straight line k1, an intersection of the straight line k1 with a surface of the first base material opposite a surface on which the male side fitting portion is provided is defined as a point O1, and a straight line orthogonal to the straight line k1 passing through the point O1 is defined as a reference line k2.

A position on one end portion side of the straight line k1 of the first base material, farthest from the reference line k2 on a terminal of the male side fitting member is defined as a point A3. A distance $D_{A3}$ (mm) between the point A3 and the reference line k2 is measured (a region where the male side fitting portion is located with respect to the reference line k2 is defined as + (plus), and a region on a side opposite the region where the male side fitting portion is located with respect to the reference line k2 is defined as − (minus)).

A position on the other end portion side of the straight line k1 of the first base material, farthest from the reference line k2 on the terminal of the male side fitting member is defined as a point B3. A distance $D_{B3}$ (mm) between the point B3 and the reference line k2 is measured (the plus and the minus are the same as the distance $D_{A3}$).

An average of the distance $D_{A3}$ and the distance $D_{B3}$ is obtained, and an average value thereof is defined as a position $D_3$ of the terminal of the male side fitting member with respect to the reference line k2.

Method (4)

A center line of the female side fitting portion in a width direction is defined as a straight line k3, an intersection of the straight line k3 with a surface of the second base material opposite a surface on which the female side fitting portion is provided is defined as a point O2, and a straight line orthogonal to the straight line k3 passing through the point O2 is defined as a reference line k4.

A position on one end portion side of the straight line k3 of the second base material, farthest from the reference line k4 on a terminal of the female side fitting member is defined as a point A5. A distance $D_{A5}$ (mm) between the point A5 and the reference line k4 is measured (a region where the female side fitting portion is located with respect to the reference line k4 is defined as + (plus), and a region on a side opposite the region where the female side fitting portion is located with respect to the reference line k4 is defined as − (minus)).

A position on the other end portion side of the straight line k3 of the second base material, farthest from the reference line k4 on the terminal of the female side fitting member is defined as a point B5. A distance $D_{B5}$ (mm) between the point B5 and the reference line k4 is measured (the plus and the minus are the same as the distance $D_{A5}$).

An average of the distance $D_{A5}$ and the distance $D_{B5}$ is obtained, and an average value thereof is defined as a position $D_5$ of the terminal of the female side fitting member with respect to the reference line k4.

[4] The fitting tool according to any one of [1] to [3], in which a tensile stress obtained by the following tensile stress measurement is 5 N/mm or more and 30 N/mm or less.

(Tensile Stress Measurement)

A test piece having a length of 120 mm in the longitudinal direction is cut out from the male side fitting member, both ends of the test piece in the longitudinal direction are gripped by a tensile testing machine, and a tensile test is performed under conditions of a chuck distance of 50 mm and a test speed of 1 mm/min, thereby obtaining a tensile stress (N/mm) by dividing a test force (N) at 2% elongation by an elongation amount (mm).

[5] The fitting tool according to any one of [1] to [4], in which, in each of the first base material and the second base material, a ratio of a thickness of each layer to a total thickness of the base material is 10% to 47% for the main layer, 38% to 85% for the interlayer, and 5% to 25% for the seal layer.

[6] A fitting-tool-equipped bag body including the fitting tool according to any one of [1] to [5], and a bag main body that accommodates a content, in which the fitting tool is attached to an inner surface of the bag main body.

Advantageous Effects of Invention

According to the present invention, it is possible to provide a fitting tool in which interlayer peeling is less likely to occur and curling is suppressed, and a fitting-tool-equipped bag body using the fitting tool.

BRIEF DESCRIPTION OF DRAWINGS

FIG. 4 is a cross-sectional view explaining a method (2) of obtaining a curl angle $\theta_2$ of a female side fitting member.

FIG. 5 is a cross-sectional view explaining a method (3) of obtaining a position $D_3$ of a terminal of a male side fitting member.

DESCRIPTION OF EMBODIMENTS

[Fitting Tool]

Figure 1:
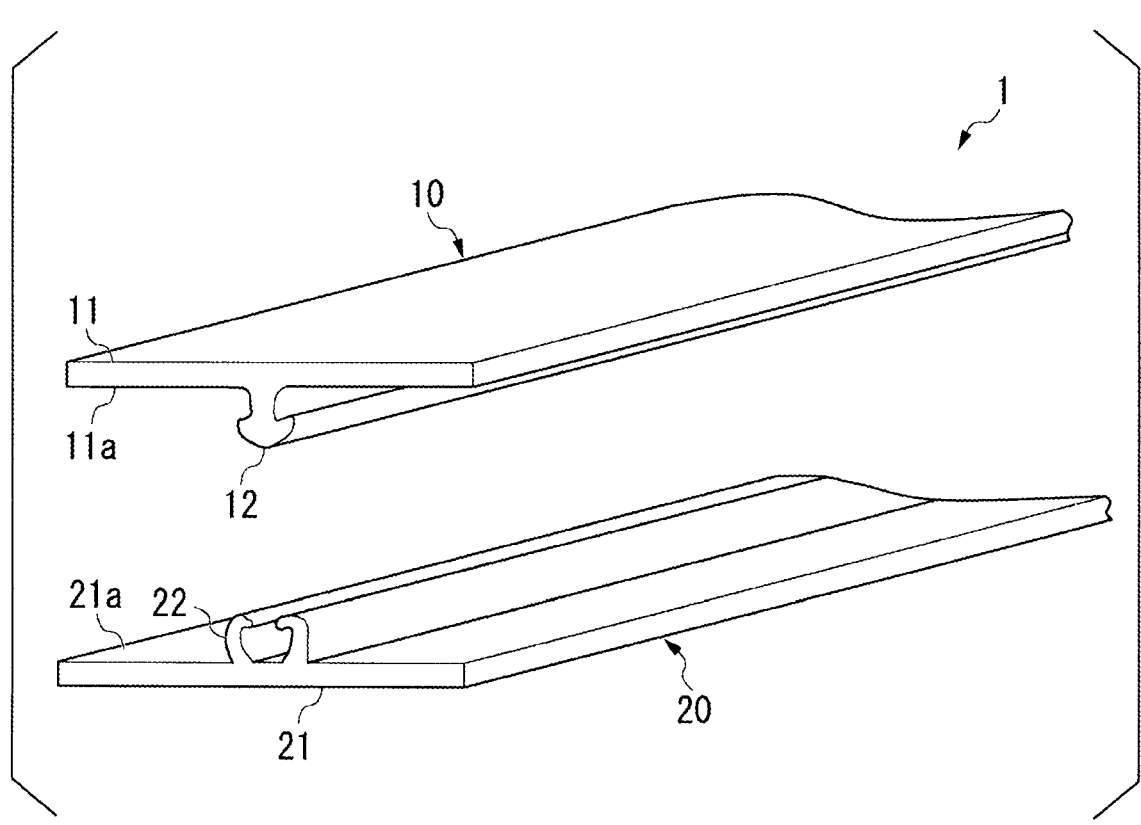
FIG. 1 is a schematic perspective view showing a fitting tool of an example of an embodiment.

Hereinafter, an example of a fitting tool of the present invention will be described with reference to the drawings. Although the dimensions and the like in the drawings illustrated in the following description are merely examples, the present invention is not limited thereto. As long as the gist of the present invention is not changed, the present invention can be embodied by appropriately modifying the dimensions and the like.

As shown in FIG. 1, a fitting tool 1 of an example of an embodiment includes a male side fitting member 10 in which a male side fitting portion 12 is provided on a surface 11a of a band-shaped first base material 11 along a longitudinal direction, and a female side fitting member 20 in which a female side fitting portion 22 is provided on a surface 21a of a band-shaped second base material 21 along a longitudinal direction.

Figure 2:
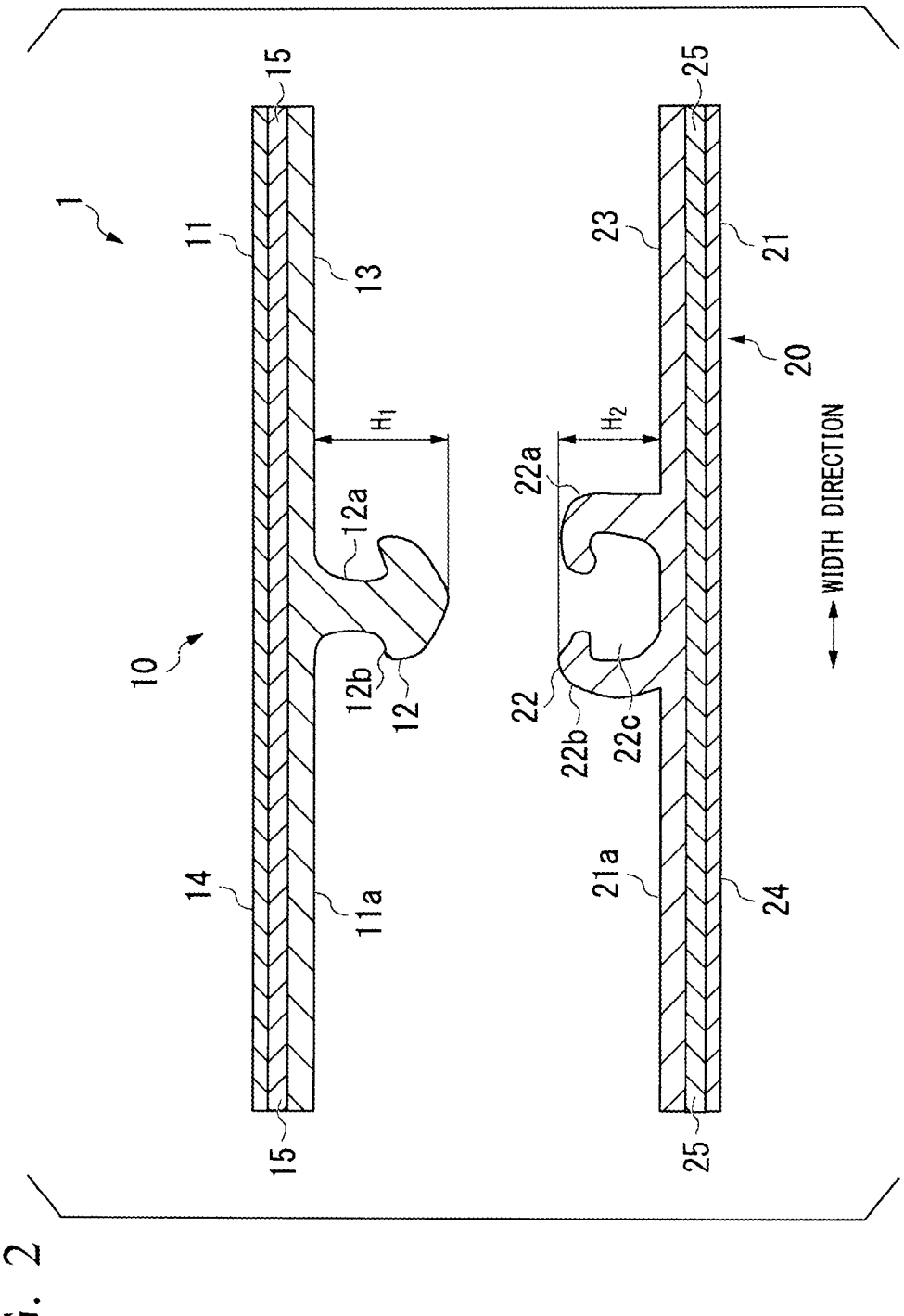
FIG. 2 is a cross-sectional view of the fitting tool of FIG. 1 cut along a surface perpendicular to a longitudinal direction.

The male side fitting portion 12 of an example shown in FIG. 2 includes a main stem portion 12a that stands up from the surface 11a of the first base material 11, which is a surface facing the second base material 21, and a head portion 12b that is provided at a distal end portion of the main stem portion 12a and has a substantially semi-circular cross section which is larger than the main stem portion 12a. The female side fitting portion 22 includes a pair of arm portions 22a and 22b that stand up from the surface 21a of the second base material 21, which is a surface facing the first base material 11, in a cross-sectional arc shape, and a recessed portion 22c is formed on the inside of the arm portions 22a and 22b.

The male side fitting portion 12 and the female side fitting portion 22 are detachably fit to each other by fitting the head portion 12b of the male side fitting portion 12 into the recessed portion 22c of the female side fitting portion 22. The male side fitting portion 12 and the female side fitting portion 22 may be detachably fit to each other, and is not limited to the aspect of FIG. 2.

As shown in FIG. 2, the first base material 11 includes a main layer 13, a seal layer 14 provided on a side of the main layer 13 opposite the male side fitting portion 12, and an interlayer 15 provided between the main layer 13 and the seal layer 14. That is, the first base material 11 has a three-layered structure in which the main layer 13, the interlayer 15, and the seal layer 14 are laminated in this order from the male side fitting portion 12 side.

The first base material 11 satisfies the following (1) to (3) requirements. In a case where the first base material 11 satisfies the requirements (1) to (3), interlayer peeling is less likely to occur in the first base material 11, and curling is suppressed from occurring in the male side fitting member 10.

(1) The main layer 13, the interlayer 15, and the seal layer 14 contain at least one kind of same type of resin (hereinafter, also referred to as "same type of A").

(2) A melting point $T_A$ (° C.) of the main layer 13, a melting point $T_B$ (° C.) of the interlayer 15, and a melting point $T_C$ (° C.) of the seal layer 14 satisfy a relationship of $T_B > T_A > T_C$.

(3) A thickness $t_A$ (μm) of the main layer 13, a thickness $t_B$ (μm) of the interlayer 15, and a thickness $t_C$ (μm) of the seal layer 14 satisfy a relationship of $t_B > t_A > t_C$.

(Requirement (1))

The expression "the main layer, the interlayer, and the seal layer containing the same type of resin" includes not only an aspect in which each layer of the main layer, the interlayer, and the seal layer contains the same resin, but also an aspect in which each layer contains a resin whose main component is composed of constitutional unit derived from the same monomer.

In addition, the expression "the constitutional unit of the main component" refers to a constitutional unit which occupies more than 50% by mass with respect to 100% by mass of all constitutional units constituting the resin.

For example, a layer containing high-density polyethylene, a layer containing low-density polyethylene, and a layer containing linear low-density polyethylene are layers containing the same type of resin A.

The same type of resin A which can be contained in the main layer 13, the interlayer 15, and the seal layer 14 is not particularly limited, and a resin used in a base material of a well-known fitting tool can be used. Examples thereof can include a polyethylene resin, a polypropylene resin, a polyester-based resin, a polyamide resin, and the like. Examples of the polyester-based resin can include polyethylene terephthalate, polyethylene naphthalate, and the like. Examples of the polyamide resin can include nylon and the like. Among these, as the same type of resin A, the polyethylene resin or the polypropylene resin is preferable because it is easy to adjust the balance between rigidity and flexibility.

The same type of resin A which can be contained in the main layer 13, the interlayer 15, and the seal layer 14 may be one or more kinds.

Specific examples of the resin forming the main layer 13 are not particularly limited, and a resin used for a base material of a well-known fitting tool can be used. Examples thereof can include polypropylene, high-density polyethylene (HDPE), low-density polyethylene (LDPE), linear low-density polyethylene (LLDPE), an ethylene-α olefin copolymer, an ethylene-vinyl acetate copolymer, a polyester-based resin, a polyamide resin, and the like. Examples of the polyester-based resin can include polyethylene terephthalate, polyethylene naphthalate, and the like. Examples of the polyamide resin can include nylon and the like. Among these, as the resin forming the main layer 13, polypropylene, LDPE, and LLDPE are preferable because it is easy to adjust the balance between the rigidity and the flexibility. The resin forming the main layer may be used alone or in combination of two or more kinds thereof.

Specific examples of the resin forming the interlayer 15 are not particularly limited, and a resin used for a base material of a well-known fitting tool can be used. Examples thereof can include polypropylene, high-density polyethylene (HDPE), low-density polyethylene (LDPE), linear low-density polyethylene (LLDPE), an ethylene-α olefin copolymer, an ethylene-vinyl acetate copolymer, a polyester-based resin, a polyamide resin, and the like. Examples of the polyester-based resin can include polyethylene terephthalate, polyethylene naphthalate, and the like. Examples of the polyamide resin can include nylon and the like. As a material for forming the interlayer 15, a resin having a density of 930 kg/m$^3$ or more is preferable, and HDPE is particularly preferable. The resin forming the interlayer may be used alone or in combination of two or more kinds thereof.

Specific examples of the resin forming the seal layer 14 are not particularly limited, and a resin used for a base material of a well-known fitting tool can be used. Examples thereof can include LLDP, polypropylene, an ethylene-vinyl acetate copolymer, an ionomer, a polyester-based resin, a polyamide resin, and the like. Examples of the polyester-based resin can include polyethylene terephthalate, polyethylene naphthalate, and the like. Examples of the polyamide resin can include nylon and the like. Among these, as the resin forming the seal layer 14, soft polypropylene and LLDPE are preferable from the viewpoint of low-temperature sealability. The material forming the seal layer may be used alone or in combination of two or more kinds thereof.

Examples of a combination of the layers containing the same type of resin A can include the following combinations.

> (A-1) A combination of the main layer 13 containing at least one of LDPE and LLDPE, the interlayer 15 containing HDPE, and the seal layer 14 containing LLDPE.
>
> (A-2) A combination of the main layer 13 and the interlayer 15 containing crystalline polypropylene, and the seal layer 14 containing soft polypropylene.
>
> (A-3) A combination of the main layer 13 containing LDPE, the interlayer 15 containing at least one of LDPE and LLDPE, and the seal layer 14 containing LLDPE.

From the viewpoint of suppressing the interlayer peeling between the layers, a content of the same type of resin A in the main layer 13 is preferably 70% by mass or more, more preferably 80% by mass or more, and still more preferably 90% by mass or more with respect to a total mass of the main layer 13.

For the same reason, a content of the same type of resin A in the interlayer 15 is preferably 70% by mass or more, more preferably 80% by mass or more, and still more preferably 90% by mass or more with respect to a total mass of the interlayer 15.

For the same reason, a content of the same type of resin A in the seal layer 14 is preferably 40% by mass or more, more preferably 50% by mass or more, and still more preferably 60% by mass or more with respect to a total mass of the seal layer 14.

The main layer 13, the seal layer 14, and the interlayer 15 can contain, as necessary, well-known additives such as a stabilizer, an antioxidant, a lubricant, an antistatic agent, a molding aid, and a colorant.

(Requirement (2))

The "melting point of the main layer" refers to a melting point of the resin constituting the main layer, and in a case where a plurality of resins constitute the main layer, it refers to a lowest melting point among melting points of the resins. The same applies to the "melting point of the interlayer" and the "melting point of the seal layer".

The melting point of the resin refers to a value measured according to JIS K7121: 2012.

The melting point $T_A$ (° C.) of the main layer 13, the melting point $T_B$ (° C.) of the interlayer 15, and the melting point $T_C$ (° C.) of the seal layer 14 satisfy the relationship of $T_B > T_A > T_C$.

From the viewpoint of suppressing curling, a difference ($T_B - T_A$) between the melting point $T_B$ and the melting point $T_A$ is preferably 2° C. or higher, more preferably 3° C. or higher, and still more preferably 5° C. or higher. From the viewpoint of good point sealability, the difference ($T_B - T_A$) is preferably 30° C. or lower, more preferably 25° C. or lower, and still more preferably 20° C. or lower. The lower limit and the upper limit of the difference ($T_B - T_A$) can be combined arbitrarily.

From the viewpoint of preventing deformation of the fitting portion due to heat in a case of being fused to the bag body, a difference ($T_A - T_C$) between the melting point $T_A$ and the melting point $T_C$ is preferably 20° C. or higher, more preferably 25° C. or higher, and still more preferably 30° C. or higher. From the viewpoint of good point sealability, the difference ($T_A - T_C$) is preferably 70° C. or lower, more preferably 60° C. or lower, and still more preferably 50° C. or lower. The lower limit and the upper limit of the difference ($T_A - T_C$) can be combined arbitrarily.

From the viewpoint of rigidity, the melting point $T_A$ of the main layer 13 is preferably 80° C. or higher, more preferably 90° C. or higher, and still more preferably 100° C. or higher. From the viewpoint of flexibility, the melting point $T_A$ of the main layer 13 is preferably 160° C. or lower, more preferably 150° C. or lower, and still more preferably 140° C. or lower. The lower limit and the upper limit of the melting point $T_A$ of the main layer 13 can be combined arbitrarily.

From the viewpoint of the rigidity and suppressing the curling, the melting point $T_B$ of the interlayer 15 is preferably 100° C. or higher, more preferably 120° C. or higher, and still more preferably 125° C. or higher. From the viewpoint of flexibility and toughness, the melting point $T_B$ of the interlayer 15 is preferably 170° C. or lower, more preferably 160° C. or lower, and still more preferably 150° C. or lower. The lower limit and the upper limit of the melting point $T_B$ of the interlayer 15 can be combined arbitrarily.

From the viewpoint of rigidity and moldability, the melting point $T_C$ of the seal layer 14 is preferably 40° C. or higher, more preferably 50° C. or higher, and still more preferably 60° C. or higher. From the viewpoint of low-temperature sealability, the melting point $T_C$ of the seal layer 14 is preferably 140° C. or lower, more preferably 130° C. or lower, and still more preferably 120° C. or lower. The lower limit and the upper limit of the melting point $T_C$ of the seal layer 14 can be combined arbitrarily.

(Requirement (3))

The "thickness of the main layer" refers to an average value of thicknesses measured at any three points in the main layer. The same applies to a "thickness of the interlayer", a "thickness of the seal layer", and a "total thickness of the base material".

The thickness $t_A$ (μm) of the main layer 13, the thickness $t_B$ (μm) of the interlayer 15, and the thickness $t_C$ (μm) of the seal layer 14 satisfy the relationship of $t_B > t_A > t_C$.

From the viewpoint of suppressing the curling, a difference ($t_B - t_A$) between the thickness $t_B$ and the thickness $t_A$ is preferably 1 μm or more, more preferably 10 μm or more, and still more preferably 20 μm or more. From the viewpoint of the flexibility, the difference ($t_B - t_A$) is preferably 300 μm or less, more preferably 200 μm or less, and still more preferably 150 μm or less. The lower limit and the upper limit of the difference ($t_B - t_A$) can be combined arbitrarily.

From the viewpoint of the rigidity and the moldability, a difference ($t_A - t_C$) between the thickness $t_A$ and the thickness $t_C$ is preferably 5 μm or more, more preferably 7 μm or more, and still more preferably 10 μm or more. From the viewpoint of sufficient sealing strength, the difference ($t_A - t_C$) is preferably 170 μm or less, more preferably 150 μm or less, and still more preferably 80 µm or less. The lower limit and the upper limit of the difference ($t_A$–$t_C$) can be combined arbitrarily.

From the viewpoint of balance between the rigidity and the flexibility, the thickness $t_A$ of the main layer 13 is preferably 5 µm or more, more preferably 10 µm or more, and still more preferably 20 µm or more. From the viewpoint of the flexibility, the thickness $t_A$ of the main layer 13 is preferably 200 µm or less, more preferably 150 µm or less, and still more preferably 120 µm or less. The lower limit and the upper limit of the thickness $t_A$ of the main layer 13 can be combined arbitrarily.

From the viewpoint of suppressing the curling, the thickness $t_B$ of the interlayer 15 is preferably 20 µm or more, more preferably 30 µm or more, and still more preferably 50 µm or more. From the viewpoint of the flexibility, the thickness $t_B$ of the interlayer 15 is preferably 400 µm or less, more preferably 300 µm or less, and still more preferably 250 µm or less. The lower limit and the upper limit of the thickness $t_B$ of the interlayer 15 can be combined arbitrarily.

From the viewpoint of sufficient sealing strength, the thickness $t_C$ of the seal layer 14 is preferably 3 µm or more, more preferably 8 µm or more, and still more preferably 10 µm or more. From the viewpoint of the flexibility, the thickness $t_C$ of the seal layer 14 is preferably 120 µm or less, more preferably 100 µm or less, and still more preferably 80 µm or less. The lower limit and the upper limit of the thickness $t_C$ of the seal layer 14 can be combined arbitrarily.

From the viewpoint that rigidity and sufficient sealing strength are easily obtained, a total thickness of the first base material 11 is preferably 100 µm or more and more preferably 120 µm or more. From the viewpoint of excellent flexibility and easy handling, the total thickness of the first base material 11 is preferably 500 µm or less and more preferably 350 µm or less. The lower limit and the upper limit of the total thickness of the first base material 11 can be combined arbitrarily, and are, for example, preferably 120 µm or more and 500 µm or less.

A ratio of the thickness of each layer to the total thickness of the first base material 11 is preferably 10% to 47% for the main layer 13, 38% to 85% for the interlayer 15, and 5% to 25% for the seal layer 14 (total of 100%), and more preferably 20% to 43% for the main layer 13, 40% to 70% for the interlayer 15, and 10% to 25% for the seal layer 14 (total of 100%). In a case where the ratio of the thickness of each layer to the total thickness of the first base material 11 is within the range described above, an effect of suppressing the occurrence of the curling in the male side fitting member 10 while suppressing the interlayer peeling is likely to be obtained.

From the viewpoint that sufficient sealing strength is easily obtained when heat-welded to a bag main body, a width of the first base material 11 is preferably 2 mm or more and more preferably 3 mm or more. From the viewpoint that flexibility is excellent, handling is easy, and deformation of the fitting tool during distribution and storage is less likely to occur, the width of the first base material 11 is preferably 60 mm or less and more preferably 40 mm or less. The lower limit and the upper limit of the width of the first base material 11 can be combined arbitrarily, and are, for example, preferably 3 mm or more and 40 mm or less.

The second base material 21 includes a main layer 23, a seal layer 24 provided on a side of the main layer 23 opposite the female side fitting portion 22, and an interlayer 25 provided between the main layer 23 and the seal layer 24. That is, the second base material 21 has a three-layered structure in which the main layer 23, the interlayer 25, and the seal layer 24 are laminated in this order from the female side fitting portion 22 side.

The second base material 21 satisfies the following (1) to (3) requirements. In a case where the second base material 21 satisfies the requirements (1) to (3), interlayer peeling is less likely to occur in the second base material 21, and curling is suppressed from occurring in the female side fitting member 20.

(1) The main layer 23, the interlayer 25, and the seal layer 24 contain at least one kind of same type of resin (hereinafter, also referred to as "same type of resin B").

(2) A melting point $T_A$ (° C.) of the main layer 23, a melting point $T_B$ (° C.) of the interlayer 25, and a melting point $T_C$ (° C.) of the seal layer 24 satisfy a relationship of $T_B > T_A > T_C$.

(3) A thickness $t_A$ (µm) of the main layer 23, a thickness $t_B$ (µm) of the interlayer 25, and a thickness $t_C$ of the seal layer 24 satisfy a relationship of $t_B > t_A > t_C$.

The items described above regarding the first base material 11 including the requirements (1) to (3) also apply to the second base material 21, and the preferred aspects are also the same. The first base material 11 and the second base material 21 may have the same configuration.

The same type of resin A contained in the main layer 13, the interlayer 15, and the seal layer 14 and the same type of resin B contained in the main layer 23, the interlayer 25, and the seal layer 24 may be the same or different from each other.

The resin forming the main layer 13 and the resin forming the main layer 23 may be the same as or different from each other. The same applies to a relationship between the resin forming the interlayer 15 and the resin forming the interlayer 25, and a relationship between the resin forming the seal layer 14 and the resin forming the seal layer 24.

The main layer 23, the seal layer 24, and the interlayer 25 can contain, as necessary, well-known additives such as a molding aid, a stabilizer, an antioxidant, a lubricant, an antistatic agent, and a colorant.

The melting point of the main layer 13 and the melting point of the main layer 23 may be the same as or different from each other. The same applies to a relationship between the melting point of the interlayer 15 and the melting point of the interlayer 25, and a relationship between the melting point of the seal layer 14 and the melting point of the seal layer 24.

The thickness of the main layer 13 and the thickness of the main layer 23 may be the same as or different from each other. The same applies to a relationship between the thickness of the interlayer 15 and the thickness of the interlayer 25, and a relationship between the thickness of the seal layer 14 and the thickness of the seal layer 24.

The total thickness of the first base material 11 and the total thickness of the second base material 21 may be the same as or different from each other.

The width of the first base material 11 and the width of the second base material 21 may be the same as or different from each other.

In the fitting tool 1, in a cut surface obtained by cutting the fitting tool 1 in a fit state in a direction perpendicular to the longitudinal direction, both a curl angle $\theta_1$ of the male side fitting member 10, which is obtained by a method (1) which will be described later and a curl angle $\theta_2$ of the female side fitting member 20, which is obtained by a method (2) which will be described later, are preferably 0.5° or more and 20° or less. In addition, the same range is preferable for angles $\theta_{1max}$ (mm), $\theta_{1min}$ (mm), $\theta_{2max}$ (mm), and $\theta_{2min}$ (mm) obtained by the method (1) and the method (2) which will be described later.

From the viewpoint of the flexibility, the curl angle $\theta_1$ is more preferably 1° or more and still more preferably 2° or more. On the other hand, from the viewpoint that the seal layer of the fitting tool and a sealant layer of the bag main body can be stably mounted during bag making, and wrinkles are not generated in the bag body, the curl angle $\theta_1$ is more preferably 15° or less and still more preferably 7° or less. The lower limit and the upper limit of the curl angle $\theta_1$ can be combined arbitrarily. In addition, the same range is preferable for $\theta_{1max}$ (mm) and $\theta_{1min}$ (mm).

For the same reason as the curl angle $\theta_1$, the curl angle $\theta_2$ is more preferably 1° or more and still more preferably 2° or more, and is more preferably 15° or less and still more preferably 7° or less. The lower limit and the upper limit of the curl angle $\theta_2$ can be combined arbitrarily. In addition, the same range is preferable for $\theta_{2max}$ (mm) and $\theta_{2min}$ (mm).

Method (1)

Figure 3:
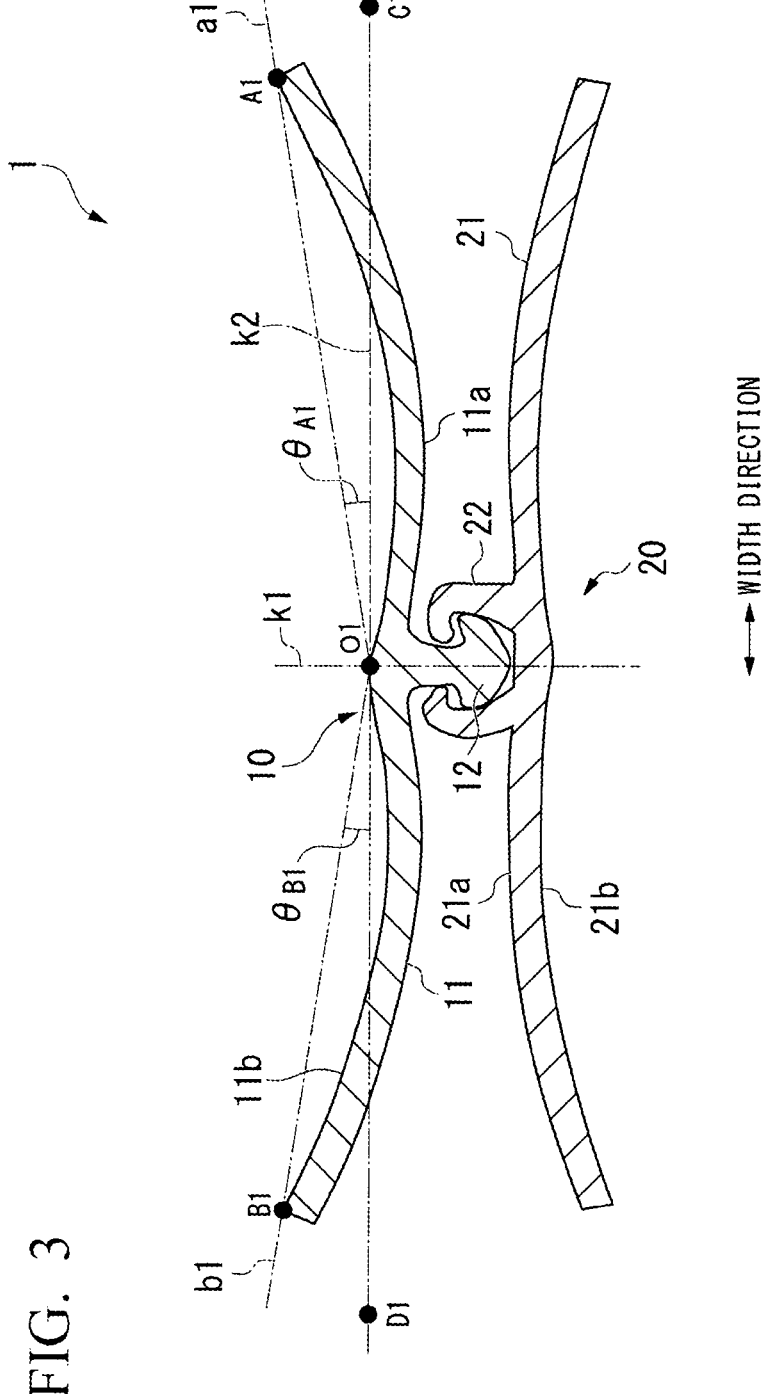
FIG. 3 is a cross-sectional view explaining a method (1) of obtaining a curl angle $\theta_1$ of a male side fitting member.

Hereinafter, the method (1) of obtaining the curl angle $\theta_1$ will be described with an example. As shown in FIG. 3, the fitting tool 1 in the fit state in which the male side fitting member 10 is disposed on an upper side and the female side fitting member 20 is disposed on a lower side is cut along a direction perpendicular to the longitudinal direction, and the cut surface is subjected to the following procedures (i) to (viii).

(i) A center line of the male side fitting portion 12 in a width direction is defined as a straight line k1, an intersection of the straight line k1 with an opposite surface 11b of the surface 11a of the first base material 11 on which the male side fitting portion 12 is provided is defined as a point O1, and a straight line orthogonal to the straight line k1 passing through the point O1 is defined as a reference line k2.

(ii) A position on one end portion side of the straight line k1 (a right side of the straight line k1 of FIG. 3) of the first base material 11, at which a distance from the straight line k2 on a surface (the opposite surface 11b in the example shown in FIG. 3) of the first base material 11 is the largest, is defined as a point A1. In a case where the one end portion side of the first base material 11 is curled toward the fitting portion side, which is opposite the example shown in FIG. 3, the point A1 is located on the surface 11a of the first base material 11.

(iii) A position of an end (a position of an end in a case where the first base material 11 is linear without being curled) on the one end portion side of the first base material 11 on the straight line k2, in a state where the first base material 11 is linearly extended along the straight line k2, is defined as a point C1.

(iv) An angle $\theta_{A1}$ (an angle in a direction curled from the reference line k2) between a straight line a1 passing through the point A1 and the point O1 and the reference line k2 is measured.

(v) A position on the other end portion side of the straight line k1 (a left side of the straight line k1 of FIG. 3) of the first base material 11, at which a distance from the straight line k2 on the surface (the opposite surface 11b in the example shown in FIG. 3) of the first base material 11 is the largest, is defined as a point B1. In a case where the other end portion side of the first base material 11 is curled toward the fitting portion side, which is opposite the example shown in FIG. 3, the point B1 is located on the surface 11a of the first base material 11.

(vi) A position of an end (a position of an end in a case where the first base material 11 is linear without being curled) on the other end portion side of the first base material 11 on the straight line k2, in a state where the first base material 11 is linearly extended along the straight line k2, is defined as a point D1.

(vii) An angle $\theta_{B1}$ (an angle in a direction curled from the reference line k2) between a straight line b1 passing through the point B1 and the point O1 and the reference line k2 is measured.

(viii) An average of the angle $\theta_{A1}$ and the angle $\theta_{B1}$ is defined as a curl angle $\theta_1$. In addition, among the angle $\theta_{A1}$ and the angle $\theta_{B1}$, an angle having a larger numerical value is defined as a maximum angle $\theta_{1max}$, and an angle having a smaller numerical value is defined as a minimum angle $\theta_{1min}$.

Method (2)

Figure 4:
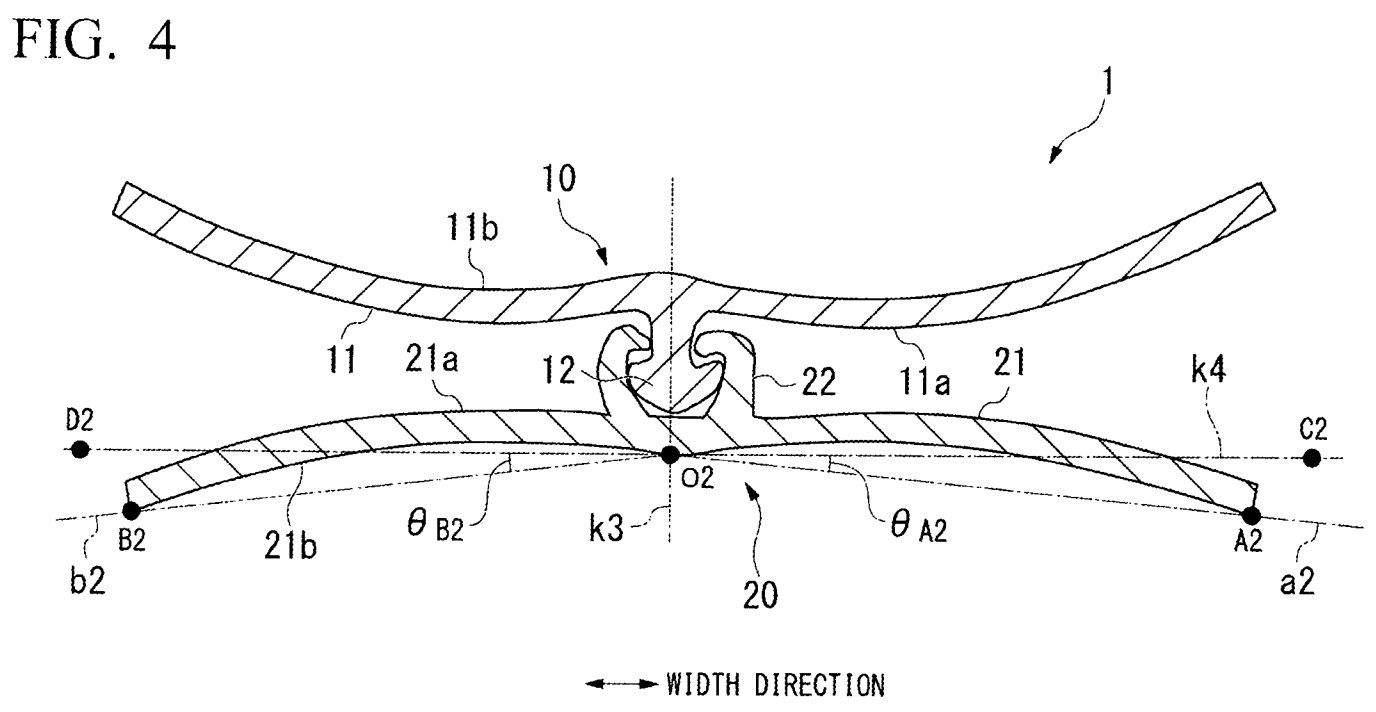

Hereinafter, the method (2) of obtaining the curl angle $\theta_2$ will be described with an example. As shown in FIG. 4, the fitting tool 1 in the fit state in which the male side fitting member 10 is disposed on an upper side and the female side fitting member 20 is disposed on a lower side is cut along a direction perpendicular to the longitudinal direction, and the cut surface is subjected to the following procedures (i) to (viii).

(i) A center line of the female side fitting portion 22 in a width direction is defined as a straight line k3, an intersection of the straight line k3 with an opposite surface 21b of the surface 21a of the second base material 21 on which the female side fitting portion 22 is provided is defined as a point O2, and a straight line orthogonal to the straight line k3 passing through the point O2 is defined as a reference line k4.

(ii) A position on one end portion side of the straight line k3 (a right side of the straight line k3 of FIG. 4) of the second base material 21, at which a distance from the straight line k4 on a surface (the opposite surface 21b in the example shown in FIG. 4) of the second base material 21 is the largest, is defined as a point A2. In a case where the one end portion side of the second base material 21 is curled toward the fitting portion side, which is opposite the example shown in FIG. 4, the point A2 is located on the surface 21a of the second base material 21.

(iii) A position of an end (a position of an end in a case where the second base material 21 is linear without being curled) on the one end portion side of the second base material 21 on the straight line k4, in a state where the second base material 21 is linearly extended along the straight line k4, is defined as a point C2.

(iv) An angle $\theta_{A2}$ (an angle in a direction curled from the reference line k4) between a straight line a2 passing through the point A2 and the point O2 and the reference line k4 is measured.

(v) A position on the other end portion side of the straight line k3 (a left side of the straight line k3 of FIG. 4) of the second base material 21, at which a distance from the straight line k4 on the surface (the opposite surface 21b in the example shown in FIG. 4) of the second base material 21 is the largest, is defined as a point B2. In a case where the other end portion side of the second base material 21 is curled toward the fitting portion side, which is opposite the example shown in FIG. 4, the point B2 is located on the surface 21*a* of the second base material 21.

(vi) A position of an end (a position of an end in a case where the second base material 21 is linear without being curled) on the other end portion side of the second base material 21 on the straight line k4, in a state where the second base material 21 is linearly extended along the straight line k4, is defined as a point D2.

(vii) An angle $\theta_{B2}$ (an angle in a direction curled from the reference line k4) between a straight line b2 passing through the point B2 and the point O2 and the reference line k4 is measured.

(viii) An average of angle $\theta_{A2}$ and angle $\theta_{B2}$ is defined as a curl angle $\theta_2$. In addition, among angle $\theta_{A2}$ and angle $\theta_{B2}$, an angle having a larger numerical value is defined as a maximum angle $\theta_{2max}$, and an angle having a smaller numerical value is defined as a minimum angle $\theta_{2min}$.

In the fitting tool 1, in a cut surface obtained by cutting the fitting tool 1 in a fit state in a direction perpendicular to the longitudinal direction, both a position $D_3$ of a terminal of the male side fitting member 10, which is obtained by a method (3) which will be described later, and a position $D_5$ of a terminal of the female side fitting member 20, which is obtained by a method (4) which will be described later, are preferably −1.5 mm or more and +0.75 mm or less. In addition, the same range is preferable for position $D_{3max}$ (mm), $D_{3min}$ (mm), $D_{5max}$ (mm), and $D_{5min}$ (mm) obtained by the method (3) and the method (4) which will be described later.

In a case where the curl is too large, the mounting to the bag body is not stable, adhesion cannot be performed properly, and wrinkles are generated during the adhesion. Therefore, the position $D_3$ of the terminal of the male side fitting member 10 is preferably −1.0 mm or more and +0.73 mm or less, more preferably −0.8 mm or more and +0.68 mm or less, and particularly preferably −0.8 mm or more and +0.5 mm or less. In particular, in a case where excessively large curling occurs on a side opposite a side where the fitting portion is provided, adhesion to the bag body cannot be performed properly. In addition, the same range is preferable for $D_{3max}$ (mm) and $D_{3min}$ (mm).

For the same reason as the position $D_3$ of the terminal of the male side fitting member 10, the position $D_5$ of the terminal of the female side fitting member 20 is more preferably −1.0 mm or more and +0.73 mm or less, still more preferably −0.8 mm or more and +0.68 mm or less, and particularly preferably −0.8 mm or more and +0.5 mm or less. In addition, the same range is preferable for $D_{5max}$ (mm) and $D_{5min}$ (mm).

Method (3)

Figure 5:
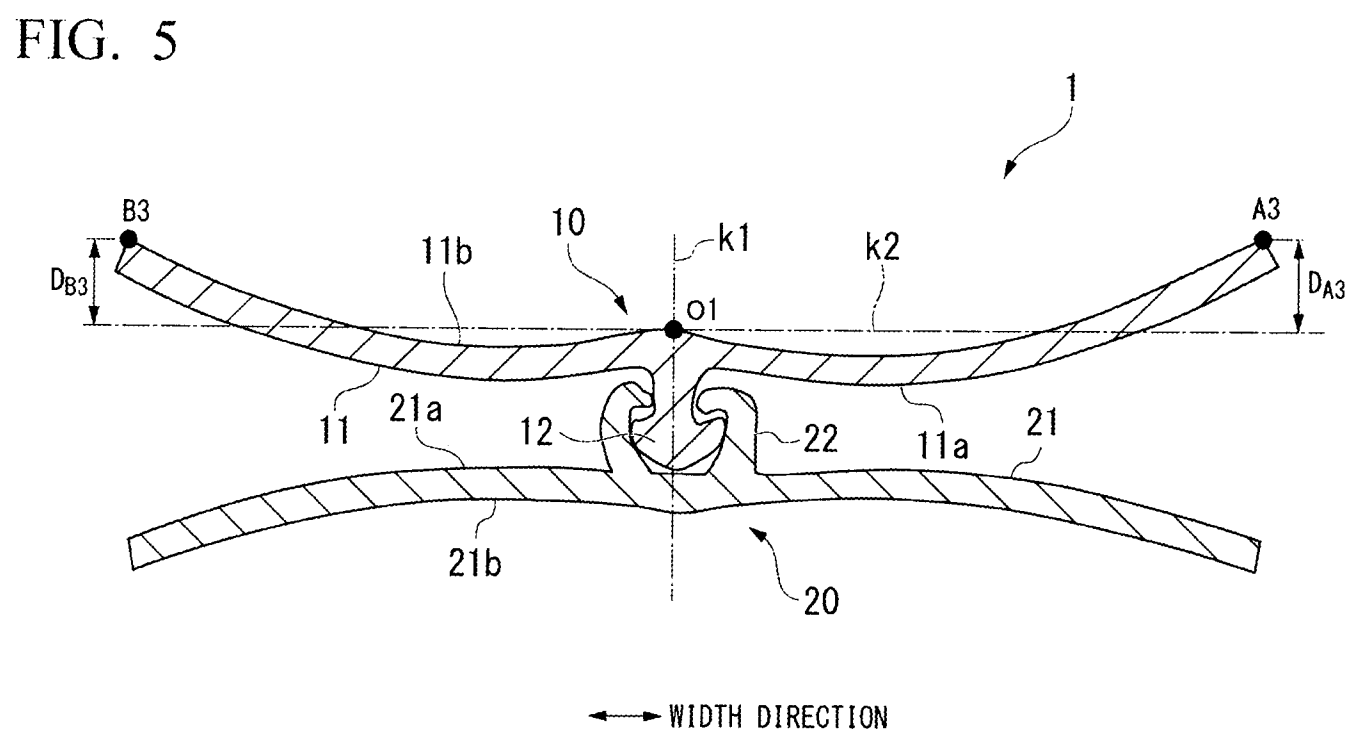

Hereinafter, the method (3) of obtaining the position $D_3$ of the terminal of the male side fitting member will be described with an example. As shown in FIG. 5, the fitting tool 1 in the fit state in which the male side fitting member 10 is disposed on an upper side and the female side fitting member 20 is disposed on a lower side is cut along a direction perpendicular to the longitudinal direction, and the cut surface is subjected to the following procedures (i) to (vi).

(i) A center line of the male side fitting portion 12 in a width direction is defined as a straight line k1, an intersection of the straight line k1 with an opposite surface 11*b* of the surface 11*a* of the first base material 11 on which the male side fitting portion 12 is provided is defined as a point O1, and a straight line orthogonal to the straight line k1 passing through the point O1 is defined as a reference line k2.

(ii) A position on one end portion side of the straight line k1 (a right side of the straight line k1 of FIG. 5) of the first base material 11 and farthest from the reference line k2 on the terminal of the male side fitting member 10 is defined as a point A3.

(iii) A distance $D_{A3}$ (mm) between the point A3 and the reference line k2 is measured. Here, a region where the male side fitting portion 12 is located with respect to the reference line k2 is defined as + (plus), and a region on a side opposite the region where the male side fitting portion 12 is located with respect to the reference line k2 is defined as − (minus). That is, the distance $D_{A3}$ is a value of − (minus) in a case where the one end portion side of the first base material 11 is curled to a side opposite the male side fitting portion 12 side, and is a value of + (plus) in a case where the one end portion side thereof is curled to the male side fitting portion 12 side.

(iv) A position on the other end portion side of the straight line k1 (a left side of the straight line k1 of FIG. 5) of the first base material 11 and farthest from the reference line k2 on the terminal of the male side fitting member 10 is defined as a point B3.

(v) A distance $D_{B3}$ (mm) between the point B3 and the reference line k2 is measured. Here, the plus and the minus of the distance $D_{B3}$ are the same as the distance $D_{A3}$.

(vi) An average of the distance $D_{A3}$ and the distance $D_{B3}$ is obtained, and an average value thereof is defined as the position $D_3$ (mm) of the terminal of the male side fitting member 10 with respect to the reference line k2. In addition, among the distance $D_{A3}$ and the distance $D_{B3}$, a distance farther from the reference line k2 is defined as $D_{3max}$ (mm), and a distance closer to the reference line k2 is defined as $D_{3min}$ (mm). That is, among $D_{A3}$ and $D_{B3}$, a distance having a larger absolute value is defined as $D_{3max}$, and a distance having a smaller absolute value is defined as $D_{3min}$.

Method (4)

Figure 6:
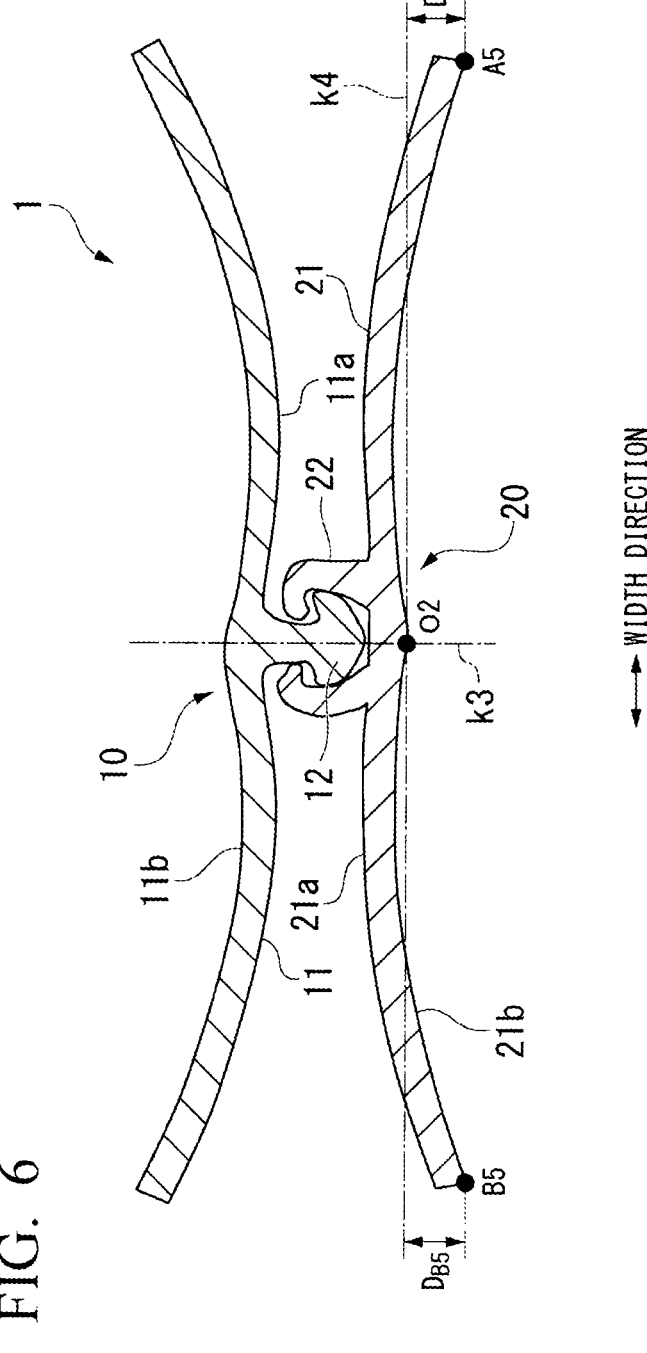
FIG. 6 is a cross-sectional view explaining a method (4) of obtaining a position $D_5$ of a terminal of a female side fitting member.

Hereinafter, the method (4) of obtaining the position $D_5$ of the terminal of the female side fitting member will be described with an example. As shown in FIG. 6, the fitting tool 1 in the fit state in which the male side fitting member 10 is disposed on an upper side and the female side fitting member 20 is disposed on a lower side is cut along a direction perpendicular to the longitudinal direction, and the cut surface is subjected to the following procedures (i) to (vi).

(i) A center line of the female side fitting portion 22 in a width direction is defined as a straight line k3, an intersection of the straight line k3 with an opposite surface 21*b* of the surface 21*a* of the second base material 21 on which the female side fitting portion 22 is provided is defined as a point O2, and a straight line orthogonal to the straight line k3 passing through the point O2 is defined as a reference line k4.

(ii) A position on one end portion side of the straight line k3 (a right side of the straight line k3 of FIG. 6) of the second base material 21 and farthest from the reference line k4 on the terminal of the female side fitting member 20 is defined as a point A5.

(iii) A distance $D_{A5}$ (mm) between the point A5 and the reference line k4 is measured. Here, a region where the female side fitting portion 22 is located with respect to the reference line k4 is defined as + (plus), and a region on a side opposite the region where the female side fitting portion 22 is located with respect to the reference line k4 is defined as − (minus). That is, the distance $D_{A5}$ is a value of − (minus) in a case where the one end portion side of the second base material 21 is curled to a side opposite the female side fitting portion 22 side, and is a value of + (plus) in a case where the one end portion side thereof is curled to the female side fitting portion 22 side.

(iv) A position on the other end portion side of the straight line k3 (a left side of the straight line k3 of FIG. 6) of the second base material 21 and farthest from the reference line k4 on the terminal of the female side fitting member 20 is defined as a point B5.

(v) A distance $D_{B5}$ (mm) between the point B5 and the reference line k4 is measured. Here, the plus and the minus of the distance $D_{B5}$ are the same as the distance $D_{A5}$.

(vi) An average of the distance $D_{A5}$ and the distance $D_{B5}$ is obtained, and an average value thereof is defined as the position $D_5$ (mm) of the terminal of the female side fitting member 20 with respect to the reference line k4. In addition, among the distance $D_{A5}$ and the distance $D_{B5}$, a distance farther from the reference line k4 (a distance having a larger absolute value) is defined as $D_{5max}$ (mm), and a distance closer to the reference line k4 (a distance having a smaller absolute value) is defined as $D_{5min}$ (mm).

In the fitting tool 1, a tensile stress obtained by the tensile stress measurement which will be described later is preferably 5 N/mm or more and 30 N/mm or less. Accordingly, the fitting tool having sufficient rigidity and flexibility is obtained.

From the viewpoint of having the sufficient rigidity, the tensile stress is preferably 5 N/mm or more, more preferably 6.5 N/mm or more, and still more preferably 8 N/mm or more. From the viewpoint of sufficient flexibility, the tensile stress is preferably 30 N/mm or less, more preferably 25 N/mm or less, and still more preferably 20 N/mm or less. The lower limit and the upper limit of the tensile stress can be combined arbitrarily.

Tensile Stress Measurement

A test piece having a length of 120 mm in the longitudinal direction is cut out from the male side fitting member, both ends of the test piece in the longitudinal direction are gripped by a tensile testing machine, and a tensile test is performed under conditions of a chuck distance of 50 mm and a test speed of 1 mm/min, thereby obtaining a tensile stress (N/mm) by dividing a test force (N) at 2% elongation by an elongation amount (mm).

(Manufacturing Method)

A manufacturing method of the fitting tool 1 is not particularly limited, as long as the requirements (1) to (3) are satisfied by adjusting the materials used for the first base material and the second base material and the thickness of each layer, and a well-known method can be used.

For example, a method can be exemplified in which a resin material for forming a main layer, an interlayer, and a seal layer is prepared by melt-kneading, and the like, and co-extruding is performed using an extruder including a composite shape die for forming a male side fitting member or a female side fitting member including a three-layered base material.

As a method of mixing the materials, a method of dry-mixing the materials using a super mixer, a Henschel mixer, or the like is an exemplary example.

As a melt-kneading method, a method of supplying raw materials to a melt-kneading machine such as a single screw extruder, a twin screw extruder, a Banbury mixer, a kneader, a mixing roll, or the like, and melt-kneading the raw materials is an exemplary example.

As a molding method, an extrusion molding method, an injection molding method, an inflation molding method, a vacuum molding method, and the like are exemplary examples.

The fitting tool of the present invention is not limited to the fitting tool 1 described above.

For example, the form of the male side fitting portion and the female side fitting portion is not limited to the form shown in FIGS. 1 and 2, and a well-known form can be adopted without limitation.

The configurations of the first base material and the second base material may be different from each other as long as each of the requirements (1) to (3) is satisfied.

[Fitting-Tool-Equipped Bag Body]

The fitting-tool-equipped bag body of the present invention is a fitting-tool-equipped bag body including the fitting tool of the present invention. The fitting-tool-equipped bag body of the present invention can adopt a well-known aspect, as long as it includes the fitting tool of the present invention.

Hereinafter, the fitting-tool-equipped bag body of an example of an embodiment will be described.

Figure 7:
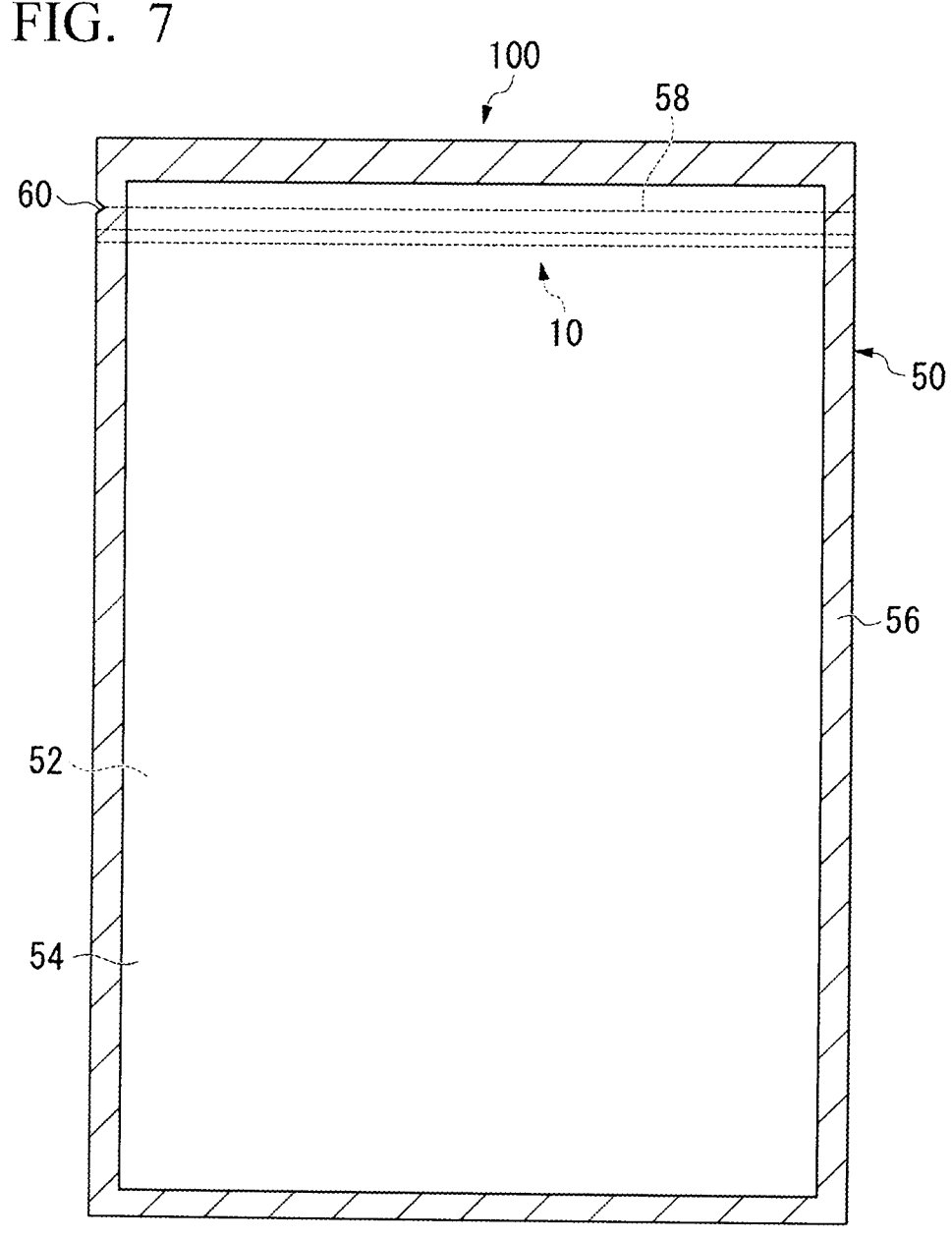
FIG. 7 is a schematic front view showing a fitting-tool-equipped bag body of an example of an embodiment.

A fitting-tool-equipped bag body 100 (hereinafter, also simply referred to as the "bag body 100") of an example shown in FIG. 7 includes a bag main body 50 that accommodates a content, and the fitting tool 1 attached to an inner surface of an upper portion of the bag main body 50.

The bag main body 50 has a rectangular shape in a front view. The fitting tool 1 is provided to extend in a short direction of the bag main body 50 on the inner surface of the upper portion side of the bag main body 50. A shape of the bag main body 50 is not limited to a rectangle.

The bag main body 50 is sealed in a state of enclosing a content (not shown). The bag main body 50 is obtained by superimposing a first film material 52 and a second film material 54 and heat-sealing all of four peripheral portions 56. In the peripheral portions 56, both ends of the fitting tool 1 are heat-sealed together with the first film material 52 and the second film material 54.

The first film material 52 and the second film material 54 may be capable of welding the fitting tool 1 by heat sealing, and a laminated film including at least a sealant layer and a base material layer from the inner surface side is preferable.

As the base material layer included in the laminated film, linear low-density polyethylene, low-density polyethylene, high-density polyethylene, polyester, biaxially stretched nylon, biaxially stretched polypropylene, and the like are exemplary examples.

As the sealant layer included in the laminated film, linear low-density polyethylene, low-density polyethylene, uniaxially stretched polypropylene, an ethylene-vinyl acetate copolymer, an ionomer, and the like are exemplary examples.

A functional layer such as a barrier layer or the like may be provided in the laminated film.

In addition, the first film material 52 and the second film material 54 may be single-layer films consisting of only the sealant layer.

In the bag main body 50, a cutting assistance line 58 is provided on an upper side with respect to the fitting tool 1 along the fitting tool 1.

The cutting assistance line 58 is a portion that is processed linearly to assist the cutting of the bag main body 50. As the cutting assistance line 58, for example, a weakened line provided in a portion of the cutting assistance line 58 of the first film material 52 and the second film material 54 is an exemplary example. The weakened line can be formed by providing a thin portion in the film material with respect to the periphery. In addition, the weakened line can also be formed by perforations or a row of pores.

In addition, the cutting assistance line 58 is not limited to the weakened line, and may be a line formed by printing or the like, which indicates a position to be cut by scissors, a cutter, or the like.

A notch 60 is formed on an end portion of the cutting assistance line 58 of the peripheral portion 56. A shape of the notch 60 is not particularly limited, and a triangular or semicircular notch can be adopted. In addition, the notch 60 may be a notch provided in the peripheral portion 56.

Figure 8:
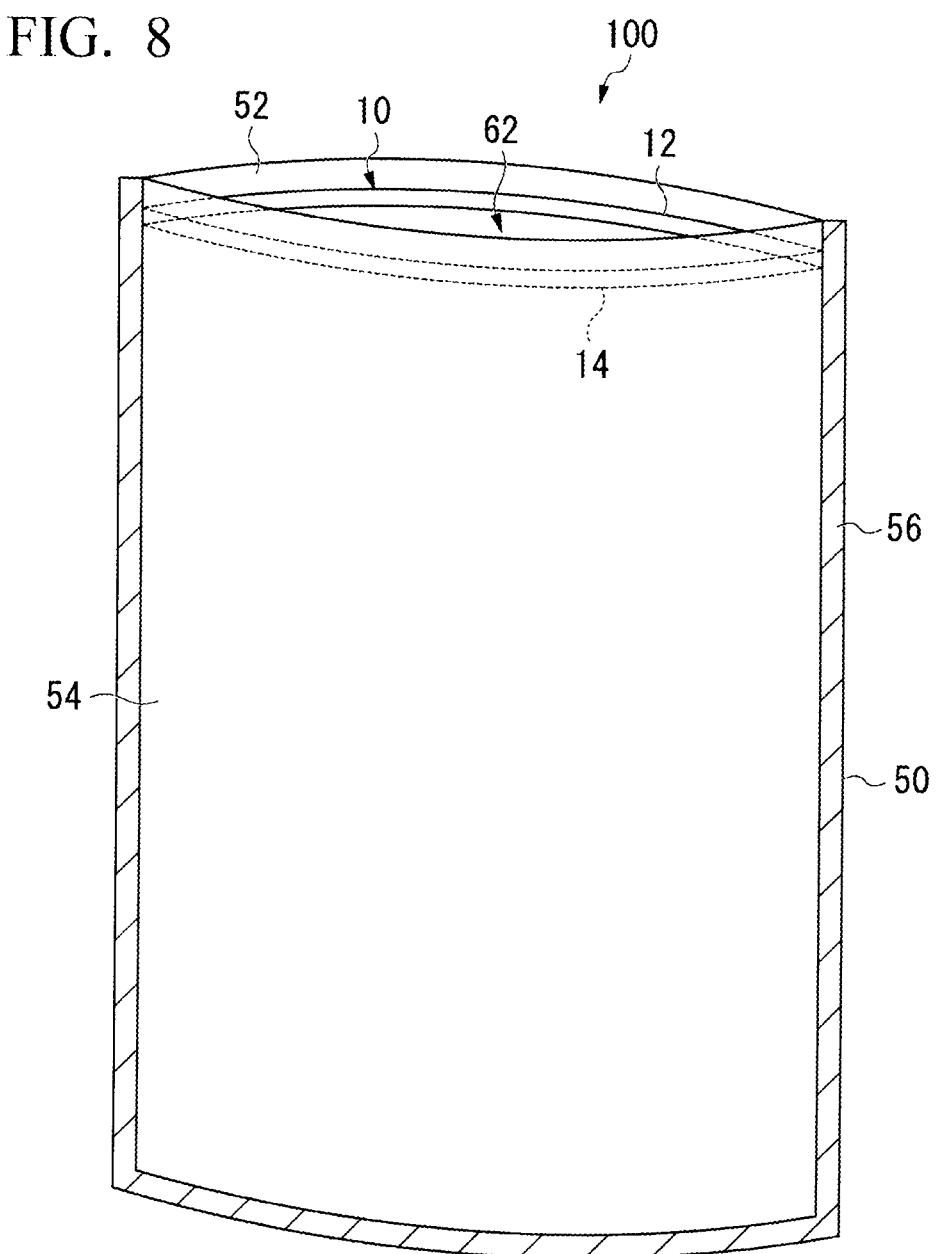
FIG. 8 is a perspective view showing a state in which an upper portion of the fitting-tool-equipped bag body of FIG. 7 is opened.

FIG. 8 is a schematic perspective view showing a state in which the bag body 100 is opened. The bag body 100 can be opened by cutting and removing the upper portion of the bag main body 50 along the cutting assistance line 58 from the notch 60 to form an opening portion 62 on the upper portion.

The opening portion 62 formed in the bag body 100 can be repeatedly opened and closed by attaching and detaching the male side fitting member 10 and the female side fitting member 20 of the fitting tool 1.

As described above, although preferred examples of the embodiments according to the present invention have been described with reference to the accompanying drawings, the present invention is not limited to such examples. The variety of shapes, combinations, and the like of the individual constituent members described in the above-described examples are examples, and a variety of modifications are permitted based on design requirements and the like without departing from the gist of the present invention.

Hereinafter, the present invention will be described in detail with reference to Examples, but the present invention is not limited to the following description.

[Raw Material]

Raw materials used in Examples are shown below. A MFR is a value measured under conditions of a temperature of 190° C. and a load of 2.16 kg in accordance with JIS K 7210-1.

PP1: polypropylene, MFR=6.0 g/10 min, density of 890 kg/cm$^3$, melting point of 129° C.

PP2: polypropylene, MFR=7.5 g/10 min, density of 900 kg/cm$^3$, melting point of 148° C.

PP3: a propylene-butene-1 copolymer, MFR=7.0 g/10 min, density of 890 kg/cm$^3$, melting point of 83° C.

LDPE1: low-density polyethylene, MFR=4.0 g/10 min, density of 924 kg/cm$^3$, melting point of 113° C.

LLDPE1: linear low-density polyethylene, MFR=15.0 g/10 min, density of 910 kg/cm$^3$, melting point of 124° C.

LLDPE2: linear low-density polyethylene, MFR=3.5 g/10 min, density of 915 kg/cm$^3$, melting point of 126° C.

LLDPE3: linear low-density polyethylene, MFR=12.1 g/10 min, density of 884 kg/cm$^3$, melting point of 71° C.

LLDPE4: linear low-density polyethylene, MFR=3.5 g/10 min, density of 898 kg/cm$^3$, melting point of 90° C.

HDPE1: high-density polyethylene, MFR=8.0 g/10 min, density of 964 kg/cm$^3$, melting point of 131° C.

Evaluation Method (Interlayer Peeling)

For the fitting tool manufactured in each example, a repeated opening and closing test was performed 100 times in which a fitting tool was mounted on a bag main body and the fitting tool was attached and detached by hand. Thereafter, observation was performed with a microscope to confirm the presence or absence of interlayer peeling, and an evaluation was performed according to the following evaluation criteria.

○: Interlayer peeling did not occur.

x: Interlayer peeling occurred.

(Rigidity)

A test piece having a length of 120 mm in a longitudinal direction thereof was cut out from the male side fitting member of the fitting tool obtained in each example. Both ends of the test piece in the longitudinal direction were gripped with a tensile testing machine manufactured by Toyo Seiki Seisaku-sho, Ltd., and a tensile test was performed under conditions of a chuck distance of 50 mm and a test speed of 1 mm/min. A tensile stress (N/mm) was obtained by dividing a test force (%) at 2% elongation by an elongation amount (mm), and the rigidity was evaluated according to the following evaluation criteria.

○: Moderate rigidity and flexibility were obtained and good handling property was obtained.

x: The rigidity was low, which was not suitable for the fitting member.

(Occurrence of Curling)

The presence or absence of curling of the fitting tool manufactured in each example was visually confirmed, and the adhesion to the bag main body during the bag making was evaluated according to the following evaluation criteria.

○: The curling was small, and an appearance during bag making was good.

Δ: The curling occurred, but the adhesion to the bag main body was possible.

x: The curling was large, and the adhesion to the bag main body was not possible.

(Curl Angle)

For the fitting tool manufactured in each example, the curl angle $\theta_1$ of the male side fitting member and the curl angle $\theta_2$ of the female side fitting member were obtained by the methods (1) and (2) described above.

(Position of Terminal of Fitting Member)

For the fitting tool manufactured in each example, the position $D_3$ of the terminal of the male side fitting member and the position $D_5$ of the terminal of female side fitting member were obtained by the methods (3) and (4) described above. In addition, the positions $D_{3max}$ and $D_{5max}$ where the distance from the reference line k2 was the maximum and the positions $D_{3min}$ (mm) and $D_{5min}$ (mm) where the distance from the reference line k4 was the minimum were obtained.

Example 1

A composite shape die for forming a male side fitting member and a female side fitting member having the same three-layered structure as the fitting tool 1 shown in FIGS. 1 and 2 was prepared.

As a resin material X-1 for forming the main layer, 40 parts by mass of LDPE1, 40 parts by mass of LLDPE1, and 20 parts by mass of LLDPE2 were melt-kneaded using an extruder having a diameter of 50 mm and an L/D of 30 under conditions of a molding temperature of 170° C.

As a resin material Y-1 for forming the seal layer, LDPE4 was melt-kneaded using an extruder having a diameter of 30 mm and an L/D of 30 under conditions of a molding temperature of 170° C.

As a resin material Z-1 for forming the interlayer, HDPE1 was melt-kneaded using an extruder having a diameter of 30 mm and an L/D of 30 under conditions of a molding temperature of 190° C.

The resin materials X-1, Y-1, and Z-1 were guided to a composite shape die and extrusion-molded. After that, the resin materials were guided to a cooling water tank to be cooled and solidified to obtain a fitting tool having a tape width of 13 mm and a total thickness of each of a first base material and a second base material of 0.15 mm.

In each of the first base material and the second base material, a thickness of the main layer was set to 43.5 μm, a thickness of the interlayer was set to 81.0 μm, and a thickness of the seal layer was set to 25.5 μm, and a ratio of the thickness of each layer was set to main layer/interlayer/seal layer=29/54/17.

Example 2

A fitting tool was manufactured in the same manner as in Example 1, except that the resin material forming each layer was changed as shown in Table 1, the molding temperature of the main layer was set to 190° C., the thickness of the main layer was set to 55.5 μm, the thickness of the interlayer was set to 64.5 μm, the thickness of the seal layer was set to 30 μm, and the ratio of the thickness of each layer was set to main layer/interlayer/seal layer=37/43/20.

Comparative Example 1

A fitting tool was manufactured in the same manner as in Example 1, except that the resin material X forming the main layer and the resin material Y forming the seal layer were changed as shown in Table 1, the interlayer was not provided, the thickness of the main layer was set to 117 μm, the thickness of the seal layer was set to 33 μm, and the ratio of the thickness of each layer was set to main layer/seal layer=78/22.

Table 1 shows the compositions of the main layer, the interlayer, and the seal layer of each example, and the evaluation results.

TABLE 1

| | | | Example 1 | Example 2 | Comparative Example 1 |
|---|---|---|---|---|---|
| Main layer | PP1 | % by mass | — | 100 | — |
| | LDPE1 | % by mass | 40 | — | 40 |
| | LLDPE1 | % by mass | 40 | — | 40 |
| | LLDPE2 | % by mass | 20 | — | 20 |
| | Total | % by mass | 100 | 100 | 100 |
| | Melting point $T_A$ | ° C. | 113 | 129 | 113 |
| Interlayer | HDPE1 | % by mass | 100 | — | — |
| | PP2 | % by mass | — | 100 | — |
| | Total | % by mass | 100 | 100 | — |
| | Melting point $T_B$ | ° C. | 131 | 148 | — |
| Seal layer | PP3 | % by mass | — | 40 | — |
| | LLDPE3 | % by mass | 100 | — | 100 |
| | LLDPE4 | % by mass | — | 60 | — |
| | Total | % by mass | 100 | 100 | 100 |
| | Melting point $T_C$ | ° C. | 71 | 83 | 71 |
| Ratio of thickness of each layer of base material (main layer/interlayer/seal layer) | | | 29/54/17 | 37/43/20 | 78/—/22 |
| Evaluation | Occurrence of interlayer peeling | | ○ | ○ | ○ |
| | Rigidity | Evaluation | ○ | ○ | x |
| | (tensile stress) | N/mm | 9.5 | 14.2 | 4.8 |
| | Occurrence of curling | | ○ | ○ | Δ |
| | Curl angle $\theta_1$ | Degree | 6.4 | 4.1 | 7.7 |
| | Curl maximum angle $\theta_{1max}$ | Degree | 6.4 | 4.2 | 9.1 |
| | Curl minimum angle $\theta_{1min}$ | Degree | 6.3 | 4.1 | 6.3 |
| | Curl angle $\theta_2$ | Degree | 5.9 | 2.1 | 6.9 |
| | Curl maximum angle $\theta_{2max}$ | Degree | 6.7 | 2.7 | 8.3 |
| | Curl minimum angle $\theta_{2min}$ | Degree | 5.1 | 1.6 | 5.6 |
| | Position $D_3$ of terminal | mm | −0.64 | −0.57 | +0.89 |
| | $D_{3max}$ | mm | −0.71 | −0.83 | +0.95 |
| | $D_{3min}$ | mm | −0.57 | −0.32 | +0.83 |
| | Position $D_5$ of terminal | mm | −0.49 | +0.28 | +0.81 |
| | $D_{5max}$ | mm | −0.62 | +0.42 | +0.92 |
| | $D_{5min}$ | mm | −0.36 | +0.14 | +0.70 |

As shown in Table 1, in the fitting tools of Examples 1 and 2 satisfying the requirements (1) to (3), no interlayer peeling occurred, the curl angle was small, and the occurrence of curling was suppressed.

On the other hand, in the fitting tool of Comparative Example 1 in which the interlayer was not provided and the requirements (1) to (3) were not satisfied, no interlayer peeling occurred, however, the curl angle was large, and the occurrence of curling could not be sufficiently suppressed.

REFERENCE SIGNS LIST

1 . . . Fitting tool
10 . . . Male side fitting member
11 . . . First base material
11a . . . Surface
11b . . . Opposite surface
12 . . . Male side fitting portion
13 . . . Main layer
14 . . . Seal layer
15 . . . Interlayer
20 . . . Female side fitting member
21 . . . Second base material
21a . . . Surface
21b . . . Opposite surface
22 . . . Female side fitting portion
23 . . . Main layer
24 . . . Seal layer
25 . . . Interlayer
50 . . . Bag main body
100 . . . Pitting-tool-equipped bag body

The invention claimed is:

1. A fitting tool comprising:
a male side fitting member in which a male side fitting portion is provided on a surface of a band-shaped first base material along a longitudinal direction; and
a female side fitting member in which a female side fitting portion is provided on a surface of a band-shaped second base material along the longitudinal direction,
wherein the male side fitting portion and the female side fitting portion are detachably fit,
each of the first base material and the second base material includes a main layer, a seal layer provided on a side of the main layer opposite the male side fitting portion and the female side fitting portion, and an interlayer provided between the main layer and the seal layer, and
each of the first base material and the second base material satisfies the following conditions (1) to (3),
(1) the main layer, the interlayer, and the seal layer contain at least one kind of same type of resin,
(2) a melting point TA (° C.) of the main layer, a melting point TB (° C.) of the interlayer, and a melting point TC (° C.) of the seal layer satisfy a relationship of TB>TA>TC (the melting point TA, in a case where the main layer is formed of a plurality of resins, is a lowest melting point among melting points of the resins, and the same applies to the melting point TB and the melting point TC),
(3) a thickness tA (μm) of the main layer, a thickness tB (μm) of the interlayer, and a thickness tC of the seal layer satisfy a relationship of tB>tA>tC.

2. The fitting tool according to claim 1,
wherein the interlayer contains a resin having a density of 930 kg/m3 or more.

3. The fitting tool according to claim 1,
wherein, in a cut surface obtained by cutting the fitting tool in a fit state in a direction perpendicular to the longitudinal direction, both a curl angle θ1 of the male side fitting member, which is obtained by the following method (1), and a curl angle θ2 of the female side fitting member, which is obtained by the following method (2), are 0.5° or more and 20° or less, and both a position D3 of a terminal of the male side fitting member, which is obtained by the following method (3), and a position D5 of a terminal of the female side fitting member, which is obtained by the following method (4), are −1.5 mm or more and +0.75 mm or less, Method (1):
a center line of the male side fitting portion in a width direction is defined as a straight line k1, an intersection of the straight line k1 with a surface of the first base material opposite a surface on which the male side fitting portion is provided is defined as a point O1, and a straight line orthogonal to the straight line k1 passing through the point O1 is defined as a reference line k2,
a position on one end portion side of the straight line k1 of the first base material, at which a distance from the reference line k2 on the surface of the first base material is the largest, is defined as a point A1, a position of an end on the one end portion side of the first base material on the reference line k2, in a state where the first base material is linearly extended along the reference line k2, is defined as a point C1, an angle θA1 (an angle in a direction curled from the reference line) between a straight line passing through the point A1 and the point O1 and the reference line k2 is measured,
a position on the other end portion side of the straight line k1 of the first base material, at which a distance from the reference line k2 on the surface of the first base material is the largest, is defined as a point B1, a position of an end on the other end portion side of the first base material on the reference line k2, in a state where the first base material is linearly extended along the reference line k2, is defined as a point D1, an angle θB1 (an angle in a direction curled from the reference line) between a straight line passing through the point B1 and the point O1 and the reference line k2 is measured,
an average of the angle θA1 and the angle θB1 is defined as a curl angle θ1, Method (2):
a center line of the female side fitting portion in a width direction is defined as a straight line k3, an intersection of the straight line k3 with a surface of the second base material opposite a surface on which the female side fitting portion is provided is defined as a point O2, and a straight line orthogonal to the straight line k3 passing through the point O2 is defined as a reference line k4,
a position on one end portion side of the straight line k3 of the second base material, at which a distance from the reference line k4 on the surface of the second base material is the largest, is defined as a point A2, a position of an end on the one end portion side of the second base material on the reference line k4, in a state where the second base material is linearly extended along the reference line k4, is defined as a point C2, an angle θA2 (an angle in a direction curled from the reference line) between a straight line passing through the point A2 and the point O2 and the reference line k4 is measured,
a position on the other end portion side of the straight line k3 of the second base material, at which a distance from the reference line k4 on the surface of the second base material is the largest, is defined as a point B2, a position of an end on the other end portion side of the second base material on the reference line k4, in a state where the second base material is linearly extended along the reference line k4, is defined as a point D2, an angle θB2 (an angle in a direction curled from the reference line) between a straight line passing through the point B2 and the point O2 and the reference line k4 is measured, an average of angle θA2 and angle θB2 is defined as a curl angle θ2, Method (3):

a center line of the male side fitting portion in a width direction is defined as a straight line k1, an intersection of the straight line k1 with the surface of the first base material opposite a surface on which the male side fitting portion is provided is defined as a point O1, and a straight line orthogonal to the straight line k1 passing through the point O1 is defined as a reference line k2, a position on one end portion side of the straight line k1 of the first base material, farthest from the reference line k2 on a terminal of the male side fitting member is defined as a point A3, a distance DA3 (mm) between the point A3 and the reference line k2 is measured (a region where the male side fitting portion is located with respect to the reference line k2 is defined as + (plus), and a region on a side opposite the region where the male side fitting portion is located with respect to the reference line k2 is defined as − (minus)), a position on the other end portion side of the straight line k1 of the first base material, farthest from the reference line k2 on the terminal of the male side fitting member is defined as a point B3, a distance DB3 (mm) between the point B3 and the reference line k2 is measured (the plus and the minus are the same as the distance DA3), an average of the distance DA3 and the distance DB3 is obtained, and an average value thereof is defined as a position D3 of the terminal of the male side fitting member with respect to the reference line k2, Method (4):

a center line of the female side fitting portion in a width direction is defined as a straight line k3, an intersection of the straight line k3 with a surface of the second base material opposite a surface on which the female side fitting portion is provided is defined as a point O2, and a straight line orthogonal to the straight line k3 passing through the point O2 is defined as a reference line k4, a position on one end portion side of the straight line k3 of the second base material, farthest from the reference line k4 on a terminal of the female side fitting member is defined as a point A5, a distance DA5 (mm) between the point A5 and the reference line k4 is measured (a region where the female side fitting portion is located with respect to the reference line k4 is defined as + (plus), and a region on a side opposite the region where the female side fitting portion is located with respect to the reference line k4 is defined as − (minus)), a position on the other end portion side of the straight line k3 of the second base material, farthest from the reference line k4 on the terminal of the female side fitting member is defined as a point B5, a distance DB5 (mm) between the point B5 and the reference line k4 is measured (the plus and the minus are the same as the distance DA5), an average of the distance DA5 and the distance DB5 is obtained, and an average value thereof is defined as a position D5 of the terminal of the female side fitting member with respect to the reference line k4.

4. The fitting tool according to claim 1, wherein a tensile stress obtained by the following tensile stress measurement is 5 N/mm or more and 30 N/mm or less, (Tensile stress measurement)

a test piece having a length of 120 mm in the longitudinal direction is cut out from the male side fitting member, both ends of the test piece in the longitudinal direction are gripped by a tensile testing machine, and a tensile test is performed under conditions of a chuck distance of 50 mm and a test speed of 1 mm/min, thereby obtaining a tensile stress (N/mm) by dividing a test force (N) at 2% elongation by an elongation amount (mm).

5. The fitting tool according to claim 1, wherein, in each of the first base material and the second base material, a ratio of a thickness of each layer to a total thickness of the base material is 10% to 47% for the main layer, 38% to 85% for the interlayer, and 5% to 25% for the seal layer.

6. A fitting-tool-equipped bag body comprising:

the fitting tool according to claim 1; and a bag main body that accommodates a content, wherein the fitting tool is attached to an inner surface of the bag main body.

\* \* \* \* \*